(12) United States Patent
Tanaka et al.

(10) Patent No.: US 11,028,894 B2
(45) Date of Patent: Jun. 8, 2021

(54) TUBULAR VIBRATION-DAMPING DEVICE

(71) Applicant: SUMITOMO RIKO COMPANY LIMITED, Komaki (JP)

(72) Inventors: Shingo Tanaka, Komaki (JP); Takashi Hayashi, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 82 days.

(21) Appl. No.: 16/520,543

(22) Filed: Jul. 24, 2019

(65) Prior Publication Data

US 2019/0346001 A1 Nov. 14, 2019

Related U.S. Application Data

(63) Continuation of application No. PCT/JP2018/045265, filed on Dec. 10, 2018.

(30) Foreign Application Priority Data

Mar. 30, 2018 (JP) .............................. JP2018-066499

(51) Int. Cl.
*F16F 1/38* (2006.01)
*B60K 5/12* (2006.01)

(52) U.S. Cl.
CPC .......... *F16F 1/3828* (2013.01); *B60K 5/1208* (2013.01); *B60K 5/1241* (2013.01)

(58) Field of Classification Search
CPC .......... F16F 1/38; F16F 1/3828; F16F 1/3873; B60K 5/1208; B60K 5/1241; B60G 2204/41

USPC ....................................................... 267/141.2
See application file for complete search history.

(56) References Cited

U.S. PATENT DOCUMENTS

| | | | | |
|---|---|---|---|---|
| 5,058,867 A | * | 10/1991 | Hadano ............... | F16C 11/0614 267/141.3 |
| 6,068,247 A | * | 5/2000 | Rudolph ................ | F16F 13/14 267/140.12 |
| 6,116,587 A | | 9/2000 | Miyahara | |
| 6,382,605 B1 | * | 5/2002 | Kato ..................... | F16F 1/3873 267/140.12 |

(Continued)

FOREIGN PATENT DOCUMENTS

| | | |
|---|---|---|
| JP | 2001-271882 A | 10/2001 |
| JP | 3893979 B2 | 3/2007 |

OTHER PUBLICATIONS

Jan. 29, 2019 Search Report issued in International Patent Application No. PCT/JP2018/045265.

(Continued)

*Primary Examiner* — Thomas W Irvin
(74) *Attorney, Agent, or Firm* — Oliff PLC

(57) ABSTRACT

A tubular vibration-damping device including: an inner shaft member; an outer tube member; a main rubber elastic body elastically connecting the inner shaft member and the outer tube member, the main rubber elastic body being penetrated by a through hole in an axial direction; and a stopper rubber separated from the main rubber elastic body, the stopper rubber including an insert that is inserted in the through hole. A gap is provided in an axially middle portion of the insert, and the insert includes axially opposed faces that are opposed to each other in the axial direction with the gap in between.

7 Claims, 12 Drawing Sheets

(56) References Cited

U.S. PATENT DOCUMENTS

| | | | | |
|---|---|---|---|---|
| 6,659,435 B2* | 12/2003 | Yamaguchi | ........... | B60G 15/063 |
| | | | | 267/140.12 |
| 7,267,740 B2* | 9/2007 | Yasumoto | ................ | F16F 7/108 |
| | | | | 156/294 |
| 8,038,132 B2* | 10/2011 | Thornhill | ............. | F16F 13/1463 |
| | | | | 267/140.12 |
| 8,246,024 B2 | 8/2012 | Ebert et al. | | |
| 8,794,605 B2* | 8/2014 | Mizobe | ................. | F16F 1/3828 |
| | | | | 267/140.12 |
| 9,476,479 B2* | 10/2016 | Nakamura | ............ | F16F 1/3863 |
| 9,709,116 B2* | 7/2017 | Shimada | ............ | F16F 1/3828 |
| 9,771,996 B2* | 9/2017 | Ishikawa | .............. | B60K 5/1291 |
| 9,964,173 B2* | 5/2018 | Kadowaki | ............ | F16F 13/1418 |
| 2004/0017034 A1* | 1/2004 | Asano | ..................... | F16F 1/387 |
| | | | | 267/141.2 |
| 2012/0098178 A1* | 4/2012 | Yahata | .................. | F16F 1/3842 |
| | | | | 267/141.2 |
| 2013/0134641 A1* | 5/2013 | Yanagi | .................. | F16F 1/3828 |
| | | | | 267/141.2 |
| 2015/0204405 A1* | 7/2015 | Shimada | ................... | F16F 1/38 |
| | | | | 267/141.2 |
| 2015/0219175 A1* | 8/2015 | Eguchi | ................. | F16F 1/3863 |
| | | | | 267/141.7 |
| 2015/0345583 A1* | 12/2015 | Ishikawa | ............... | F16F 3/0873 |
| | | | | 248/634 |
| 2016/0053848 A1* | 2/2016 | Nakamura | ............ | F16F 1/3863 |
| | | | | 248/634 |
| 2017/0175844 A1* | 6/2017 | Kadowaki | ........... | F16F 13/1463 |

OTHER PUBLICATIONS

Mar. 26, 2021 Office Action issued in Chinese Patent Application No. 201880079159.3.

\* cited by examiner

TUBULAR VIBRATION-DAMPING DEVICE

INCORPORATED BY REFERENCE

This application is a Continuation of International Application No. PCT/JP2018/045265 filed Dec. 10, 2018, which claims priority under 35 U.S.C. §§ 119(a) and 365 of Japanese Patent Application No. 2018-066499 filed on Mar. 30, 2018, the disclosures of which are expressly incorporated herein by reference in their entireties.

BACKGROUND OF THE INVENTION

1. Field of the Invention

The present invention relates to a tubular vibration-damping device adapted to be disposed between constituent components of a vibration transmission system so as to connect the constituent components of the vibration transmission system with each other in a vibration damping manner.

2. Description of the Related Art

Conventionally, there is known a tubular vibration-damping device applied for a torque rod, an engine mount, a suspension bushing, or the like. The tubular vibration-damping device is shown, for example, in a vibration damping device disclosed in JP-A-2001-271882, and has a structure in which a shaft member and an outer tube are elastically connected by a main elastic body.

Meanwhile, in the vibration damping device of JP-A-2001-271882, for the purpose of tuning a spring ratio, vibration damping characteristics, and the like in a specific radial direction, as shown in FIG. 4 and the like of JP-A-2001-271882, a through hole is formed so as to penetrate the main elastic body in the axial direction. Furthermore, an insertion part of an auxiliary elastic member is inserted into the through hole. Accordingly, when a large load is input in the radial direction, the shaft member side and the outer tube side abut against each other via the insertion part so as to limit relative displacement between the shaft member and the outer tube, thereby preventing excessive deformation of the main elastic body.

However, as shown in FIG. 4 and the like of JP-A-2001-271882, when the plate-shaped insertion part is inserted across roughly the entire length in the axial direction of the through hole, when the insertion part is compressed in the radial direction, the spring constant of the insertion part is likely to suddenly increase. Thus, it may be difficult to realize the required characteristics in the case where the low dynamic spring characteristics are required with respect to a large load input in the radial direction.

SUMMARY OF THE INVENTION

It is therefore one object of the present invention to provide a tubular vibration-damping device of novel structure which, in the radial direction in which the through hole is provided, is able to limit relative displacement between the inner shaft member and the outer tube member, while preventing an adverse effect on the vibration damping characteristics or the like due to a sudden development of high dynamic spring.

The above and/or optional objects of this invention may be attained according to at least one of the following preferred embodiments of the invention. The following preferred embodiments and/or elements employed in each preferred embodiment of the invention may be adopted at any possible optional combinations.

Specifically, a first preferred embodiment of the present invention provides a tubular vibration-damping device comprising: an inner shaft member; an outer tube member; a main rubber elastic body elastically connecting the inner shaft member and the outer tube member, the main rubber elastic body being penetrated by a through hole in an axial direction; and a stopper rubber separated from the main rubber elastic body, the stopper rubber including an insert that is inserted in the through hole, wherein a gap is provided in an axially middle portion of the insert, and the insert includes axially opposed faces that are opposed to each other in the axial direction with the gap in between.

According to the tubular vibration-damping device structured following the first preferred embodiment, since the stopper rubber is separated from the main rubber elastic body, it is also possible to form the stopper rubber with a rubber material having different characteristics from those of the main rubber elastic body. Therefore, the respective characteristics required of the main rubber elastic body and the stopper rubber can be more reliably achieved, and for example, the low dynamic spring behavior of the stopper rubber in a high load range or the like can be advantageously realized.

Moreover, in the axially middle portion of the insert of the stopper rubber, there are provided the axially opposed faces that are opposed to each other in the axial direction with the gap in between, and the axially opposed faces are free surfaces. Therefore, when the insert is compressed by a large radial input, expansion of the insert is allowed at the axially opposed faces, thereby obtaining softer spring characteristics in a high load range. As a result, an impact caused by a sudden change in spring characteristics in a high load range or the like is reduced or avoided. Besides, a reaction force of the stopper load is reduced, thereby decreasing load acting on the fastening structure between the inner shaft member and the constituent component of the vibration transmission system such as a vehicle body, for example.

A second preferred embodiment of the present invention provides the tubular vibration-damping device according to the first preferred embodiment, wherein the stopper rubber comprises a first stopper body inserted in the through hole from a first axial opening thereof and a second stopper body inserted in the through hole from a second axial opening thereof, the first stopper body and the second stopper body include respective divided inserts that constitute the insert, and the gap is provided axially between the divided inserts.

According to the second preferred embodiment, the stopper rubber is divided into the first stopper body and the second stopper body, and the insert of the stopper rubber is constituted by the divided insert of the first stopper body and the divided insert of the second stopper body. Since the divided inserts are inserted into the through hole from the respective openings, the insert can be easily inserted into the through hole. Moreover, the gap is provided axially between the divided inserts. Thus, the entire distal end faces of the divided inserts can constitute the axially opposed faces, and it is easy to obtain a large area of the axially opposed faces, thereby advantageously producing low dynamic spring of the insert owing to the deformation of the axially opposed faces.

A third preferred embodiment of the present invention provides the tubular vibration-damping device according to the first or second preferred embodiment, wherein the gap is provided by a partial divider that is formed in the axially middle portion of the insert of the stopper rubber.

According to the third preferred embodiment, by forming the partial divider such as a hole or a notch in the insert, it is possible to easily provide the gap and the attendant axially opposed faces in the axially middle portion of the insert. In particular, even in the structure in which the insert of the stopper rubber is not divided, it is possible to provide the gap in the axially middle portion owing to the partial divider.

A fourth preferred embodiment of the present invention provides the tubular vibration-damping device according to any one of the first through third preferred embodiments, wherein the stopper rubber includes an attachment attached to an axial end of the inner shaft member.

According to the fourth preferred embodiment, the stopper rubber is attached to the inner shaft member by the attachment, whereby the stopper rubber is positioned with respect to the inner shaft member, and the insert of the stopper rubber is held in a predetermined position with respect to the through hole. Therefore, the stopper action in the radial direction due to compression of the insert will be stably and effectively exhibited.

A fifth preferred embodiment of the present invention provides the tubular vibration-damping device according to the fourth preferred embodiment, wherein the stopper rubber includes a connector extending from the insert in the axial direction, and the insert and the attachment are connected by the connector, while the connector is thinner than the insert.

According to the fifth preferred embodiment, the insert and the attachment are connected by the thin connector in the stopper rubber. Thus, owing to the deformation of the connector, it is possible to prevent the insert from being restrained any more than necessary. Moreover, since the connector is thinner than the insert, a step is formed at the connector between the connector and the insert, and the step becomes a free surface at the end face of the insert. Thus, in addition to the axially opposed faces provided in the axially middle portion of the insert, the step deforms so as to expand, thereby advantageously realizing low dynamic spring characteristics when the insert is compressed in the radial direction.

A sixth preferred embodiment of the present invention provides the tubular vibration-damping device according to any one of the first through fifth preferred embodiments, wherein in the through hole, the insert of the stopper rubber is overlapped on an inner circumferential surface on a side of the inner shaft member.

According to the sixth preferred embodiment, for example, the length of the connector that connects the attachment and the insert can be shortened. This makes it possible to prevent high dynamic spring behavior of the insert caused by the deformed connector restraining the end face of the insert.

A seventh preferred embodiment of the present invention provides the tubular vibration-damping device according to any one of the first through sixth preferred embodiments, wherein a rubber hardness of the stopper rubber is smaller than that of the main rubber elastic body.

According to the seventh preferred embodiment, it is possible to advantageously obtain low dynamic spring characteristics by the stopper rubber being softened.

An eighth preferred embodiment of the present invention provides the tubular vibration-damping device according to any one of the first through seventh preferred embodiments, wherein the insert of the stopper rubber is shorter than both of the inner shaft member and the outer tube member in the axial direction.

According to the eighth preferred embodiment, for example, the entire insert can be arranged between the inner shaft member and the outer tube member that are opposed in the radial direction. Thus, the edge of the axial end of the inner shaft member or the outer tube member is prevented from being pressed against the insert, thereby improving durability.

According to the present invention, the insert of the stopper rubber, which is inserted into the through hole of the main rubber elastic body, includes the axially opposed faces in its axially middle portion that are opposed to each other in the axial direction with the gap in between, and the axially opposed faces are free surfaces. Thus, when the insert is compressed by a large radial input, expansion of the insert is allowed at the axially opposed faces, thereby obtaining soft spring characteristics in a high load range.

BRIEF DESCRIPTION OF THE DRAWINGS

The foregoing and/or other objects, features and advantages of the invention will become more apparent from the following description of practical embodiments with reference to the accompanying drawings in which like reference numerals designate like elements and wherein.

DETAILED DESCRIPTION OF EMBODIMENTS

Figure 1:
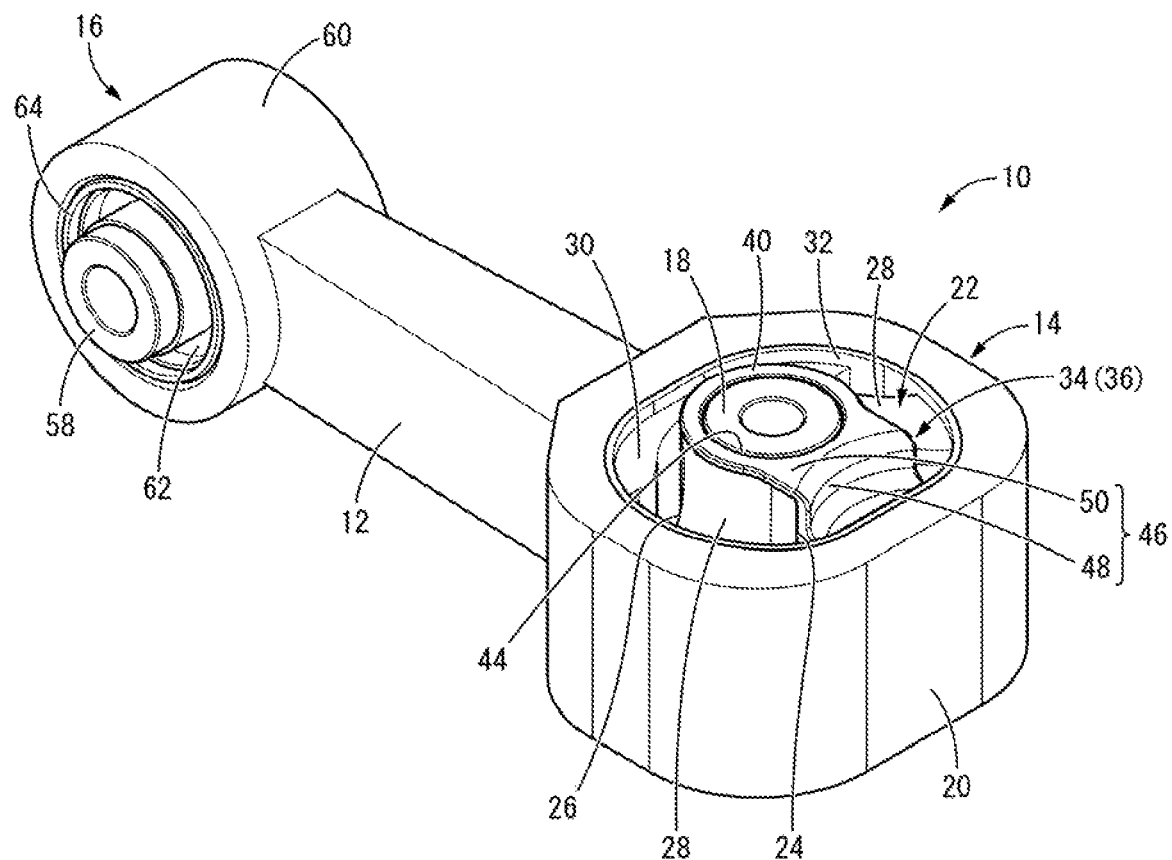
FIG. 1 is a perspective view showing a torque rod according to a first practical embodiment of the present invention.

Hereinafter, practical embodiments of the present invention will be described in reference to the drawings.

FIGS. 1 to 5 show a torque rod 10 as a first practical embodiment comprising a tubular vibration-damping device constructed according to the present invention. The torque rod 10 includes a rod main body 12, and a first bushing 14 and a second bushing 16 provided to opposite ends of the rod main body 12. In the following description, as a general rule, the vertical direction refers to the vertical direction in FIG. 2, the front-back direction refers to the lateral direction in FIG. 2, and the lateral direction refers to the vertical direction in FIG. 3. In the following description, the vertical direction, the front-back direction, and the lateral direction of the torque rod 10 roughly coincide with the vertical direction, the front-back direction, and the lateral direction of a vehicle in a state where the torque rod 10 is mounted on the vehicle.

Described more specifically, the rod main body 12 is a high rigidity component formed of metal, synthetic resin or the like, and in the present practical embodiment, is a solid rod shape extending in the front-back direction with a rectangular cross section. However, the cross-sectional shape thereof is not particularly limited.

Besides, the first bushing 14 serving as a tubular vibration-damping device is provided to one end of the rod main body 12 in the front-back direction. The first bushing 14 has a structure in which a first inner tube member 18 serving as an inner shaft member and a first outer tube member 20 serving as an outer tube member are elastically connected to each other by a first rubber elastic body 22 serving as a main rubber elastic body.

The first inner tube member 18 is a high rigidity component formed of metal or synthetic resin, and has a small-diameter, generally round tubular shape extending straightly in the vertical direction.

The first outer tube member 20 has a roughly oval tube shape which is larger in diameter than the first inner tube member 18, and is a high rigidity component formed of material similar to that of the rod main body 12. The first outer tube member 20 of the present practical embodiment is integrally formed at one end of the rod main body 12 in the front-back direction, and the vertical direction is the axial direction. Besides, the first outer tube member 20 is shorter than the first inner tube member 18 in the vertical direction.

Then, the first inner tube member 18 is inserted through the radial inside of the first outer tube member 20, and the first inner tube member 18 and the first outer tube member 20 are elastically connected by the first rubber elastic body 22 in the axis-perpendicular direction. The first rubber elastic body 22 has a thick-walled tubular shape, and its inner circumferential surface is bonded by vulcanization to the outer circumferential surface of the first inner tube member 18, while its outer circumferential surface is bonded by vulcanization to the inner circumferential surface of the first outer tube member 20. The first rubber elastic body 22 of the present practical embodiment takes the form of an integrally vulcanization molded component including the first inner tube member 18 and the first outer tube member 20.

The vertical dimension of the first inner tube member 18 is larger than the vertical dimension of the first outer tube member 20, and the vertically opposite ends of the first inner tube member 18 protrude to the vertically outside of the first outer tube member 20. Additionally, the vertical dimension of the first inner tube member 18 is larger than the vertical dimension of the first rubber elastic body 22, and the vertically opposite ends of the first inner tube member 18 is each configured such that its outer circumferential surface is exposed without being covered by the first rubber elastic body 22.

Further, the first rubber elastic body 22 is penetrated by a first through hole 24 serving as a through hole and a second through hole 26 in the vertical direction. The first through hole 24 is provided on one side in the radial direction (rightward in FIG. 2) with respect to the first inner tube member 18, and penetrates in the vertical direction with a roughly arcuate cross section. The second through hole 26 is provided on the other side in the radial direction (leftward in FIG. 2) with respect to the first inner tube member 18, and penetrates in the vertical direction with a cross-sectional shape extending for a length roughly half the circumference in the circumferential direction. In this way, by forming the first through hole 24 and the second through hole 26, the first rubber elastic body 22 is divided into parts, namely, a pair of plate-shaped connection arms 28, 28 extending circumferentially between the first and second through holes 24, 26 on one side, and a cushioning rubber 30 fixed to the first outer tube member 20 on the other side of the second through hole 26 in the front-back direction. The plate-shaped connection arms 28 and the cushioning rubber 30 are integrally connected by a rubber sheath layer 32 which covers the inner circumferential surface of the first outer tube member 20 about the entire circumference.

Figure 5:
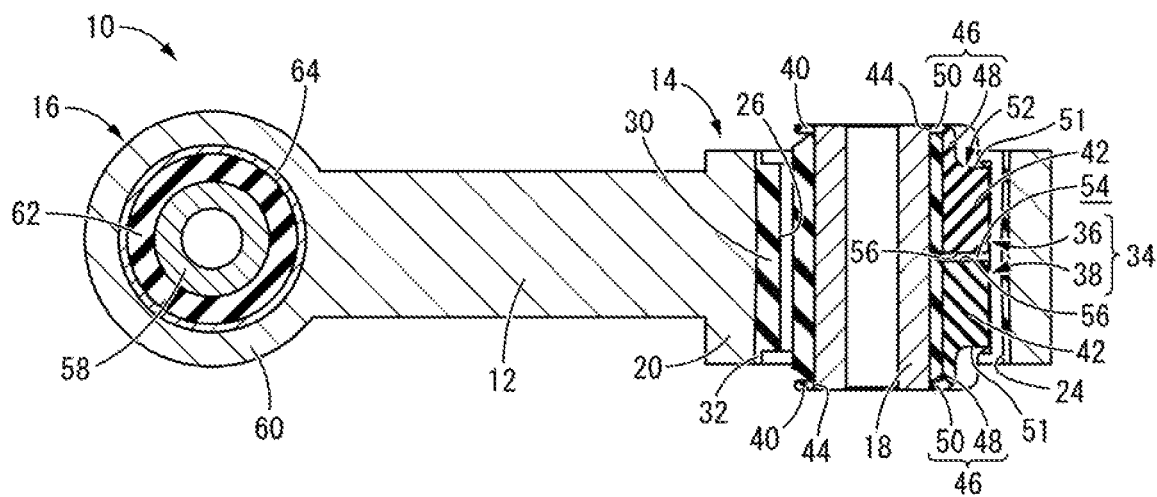
FIG. 5 is a cross-sectional view taken along line 5-5 of FIG. 3.
Figure 6:
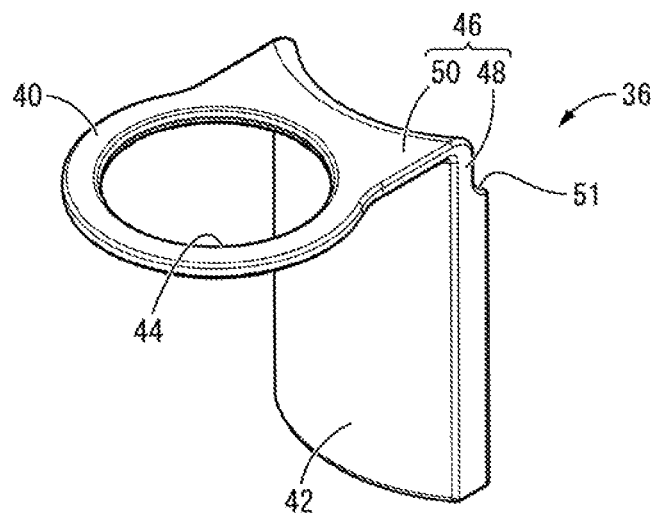
FIG. 6 is a perspective view of a stopper rubber that constitutes the torque rod shown in FIG. 1.
Figure 7:
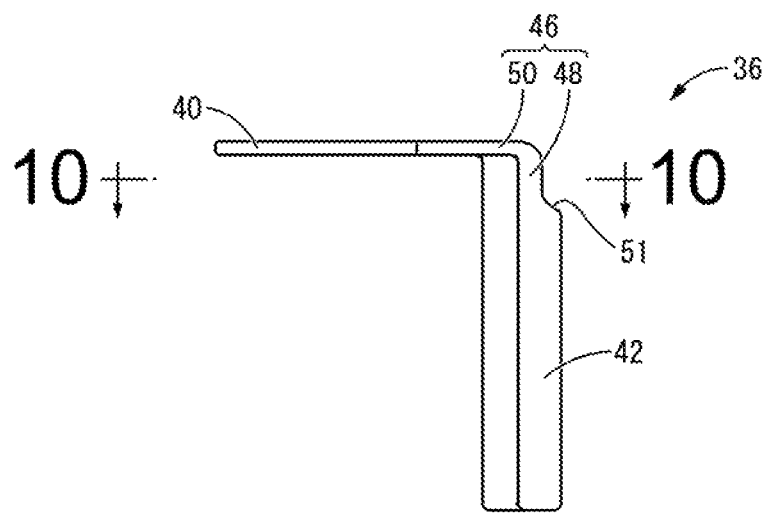
FIG. 7 is a front view of the stopper rubber shown in FIG. 6.

Besides, the first bushing 14 is disposed in a state where a stopper rubber 34 is inserted in the first through hole 24. As shown in FIG. 5, the stopper rubber 34 of the present practical embodiment comprises a first stopper body 36 and a second stopper body 38. The first stopper body 36 and the second stopper body 38 of the present practical embodiment have roughly the same structure as each other and are arranged in the opposite orientations to each other. Thus, the first stopper body 36 will be described below.

The first stopper body 36 is a component formed of a rubber elastic body, a synthetic resin elastomer, or the like, and has a rubber-like elasticity. As shown in FIGS. 6 to 10, the first stopper body 36 includes an attachment 40 to be attached to the first inner tube member 18, and a divided insert 42 to be inserted into the first through hole 24. Further, the first stopper body 36 of the present practical embodiment is formed of a material different from that of the first rubber elastic body 22, and the rubber hardness of the first stopper body 36 is smaller than that of the first rubber elastic body 22. The rubber hardness is measured, for example, according to the hardness test defined in JIS K6253 "Rubber, vulcanized or thermoplastic—Determination of hardness—".

The attachment 40 has an annular shape or an annular disk shape, and is vertically penetrated by a circular mounting hole 44 corresponding to the outer circumferential surface of the first inner tube member 18. In the attachment 40 of the present practical embodiment, the thickness dimension in the vertical direction is smaller than the width dimension in the radial direction, and the deformation rigidity in the vertical direction of the attachment 40 is low.

Figure 8:
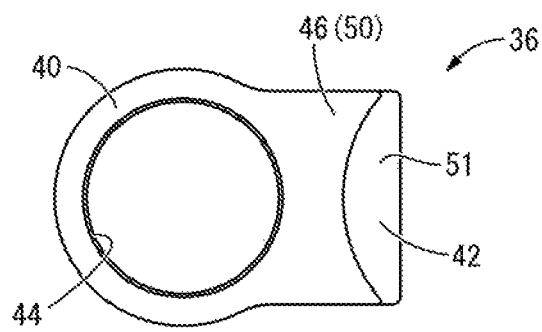
FIG. 8 is a plan view of the stopper rubber shown in FIG. 7.
Figure 9:
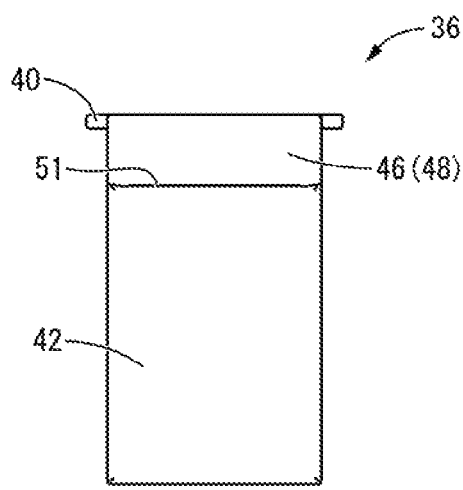
FIG. 9 is a right side view of the stopper rubber shown in FIG. 7.

The divided insert 42 is of a plate shape having an arcuate cross section, with one surface in the thickness direction being roughly flat while the other surface in the thickness direction being a curving surface that becomes thicker towards the center in the width direction (the vertical direction in FIG. 8). Besides, the vertical dimension of the divided insert 42 is smaller than half of the vertical dimension of the first outer tube member 20, so that the divided insert 42 is shorter than both of the first inner tube member 18 and the first outer tube member 20 in the vertical direction.

Figure 10:
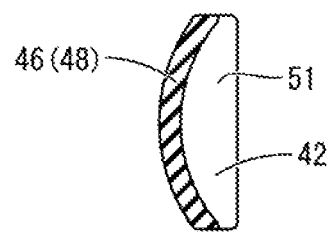
FIG. 10 is a cross-sectional view taken along line 10-10 of FIG. 7.
Figure 11:
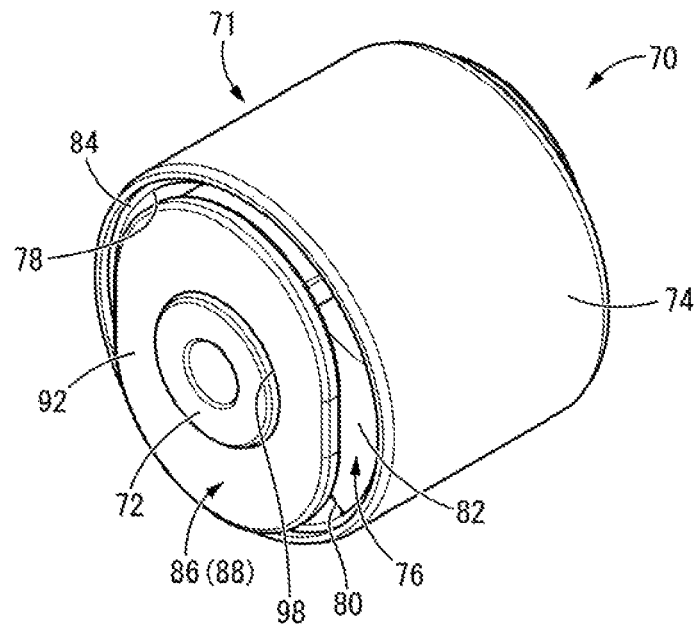
FIG. 11 is a perspective view showing a motor mount according to a second practical embodiment of the present invention.
Figure 12:
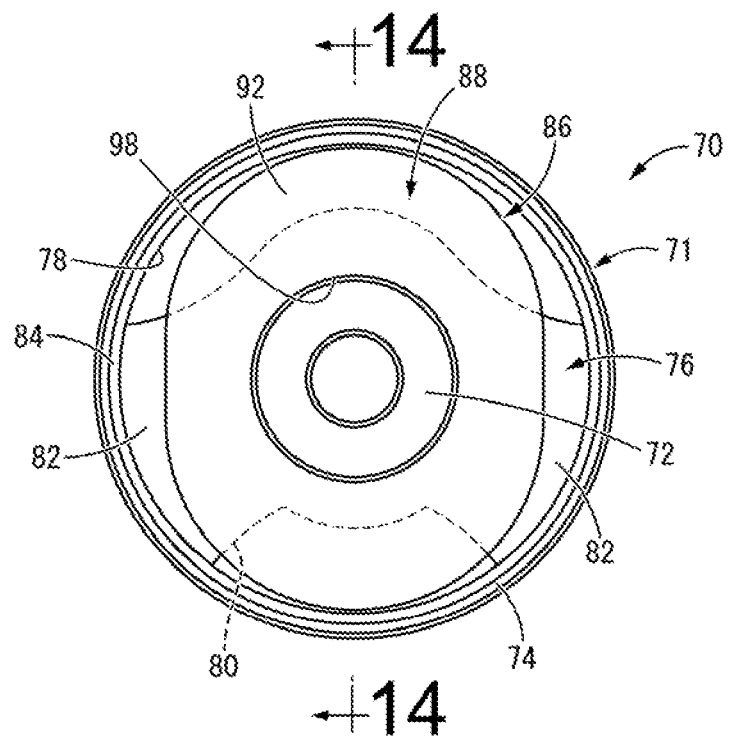
FIG. 12 is a front view of the motor mount shown in FIG. 11.
Figure 13:
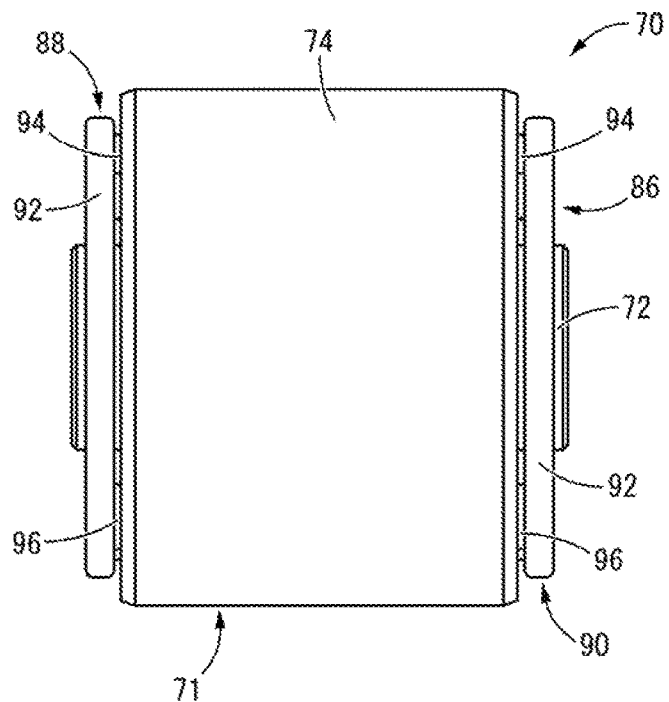
FIG. 13 is a right side view of the motor mount shown in FIG. 12.

Additionally, the divided insert 42 and the attachment 40 are integrally connected via a connector 46. With respect to the connector 46, the divided insert 42 side comprises a curving plate-shaped vertical plate part 48 extending in the vertical direction, and the attachment 40 side comprises a flat plate-shaped lateral plate part 50 extending roughly orthogonally to the vertical direction. The connector 46 extends upward from the divided insert 42, and its upper end portion bends and extends in the front-back direction toward the attachment 40. Moreover, the connector 46 is thinner than the divided insert 42, and in particular, the lateral plate part 50 is thinner than the vertical plate part 48. Furthermore, as shown in FIG. 10, with the vertical plate part 48 of the connector 46, the opposite sides in the thickness direction are curving surfaces corresponding to the divided insert 42, and the overall thickness dimension is roughly constant. Further, the vertical plate part 48 of the connector 46 extends upward from the end of the curving surface side in the thickness direction of the divided insert 42 (the left side in FIG. 7), so that the axial end face of the divided insert 42 on the flat surface side from the vertical plate part 48 (the right side in FIG. 7) in the thickness direction of the divided insert 42 comprises a step surface 51, which is a free surface.

Then, the first stopper body 36 and the second stopper body 38 integrally provided with the attachment 40, the divided insert 42, and the connector 46 are attached to the first inner tube member 18 and inserted in the first through hole 24, as shown in FIGS. 1 to 5.

Figure 2:
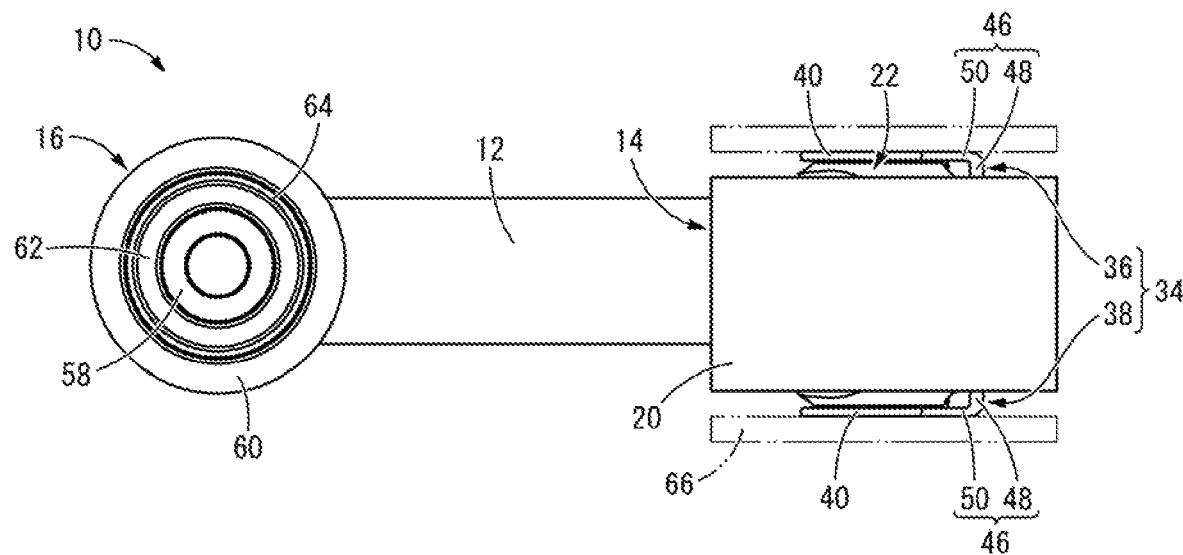
FIG. 2 is a front view of the torque rod shown in FIG. 1.

Specifically, as shown in FIGS. 1, 2, 5, and the like, the vertical end of the first inner tube member 18 is inserted into the mounting hole 44 of the attachment 40 of the first stopper body 36, and the attachment 40 is attached to the upper end of the first inner tube member 18 so as to be externally placed thereon. Furthermore, in a state where the first stopper body 36 is attached to the first inner tube member 18, the divided insert 42 of the first stopper body 36 is inserted in the first through hole 24 of the first rubber elastic body 22 from the upper opening, namely, the first axial opening, and the divided insert 42 is disposed between the first inner tube member 18 and the first outer tube member 20 in the front-back direction. Since the vertical dimension of the divided insert 42 is smaller than half of the vertical dimension of the first outer tube member 20, the divided insert 42 of the first stopper body 36 is arranged above the vertical center of the first outer tube member 20 and below the upper end of the first outer tube member 20.

Furthermore, the second stopper body 38 has a structure which is vertically inverted with respect to the first stopper body 36, and the attachment 40 is attached to the lower end of the first inner tube member 18 so as to be externally placed thereon, while the divided insert 42 is inserted in the first through hole 24 from the lower opening, namely, the second axial opening. The divided insert 42 of the second stopper body 38 is arranged below the vertical center of the first outer tube member 20 and above the lower end of the first outer tube member 20.

In the present practical embodiment, each divided insert 42 of the first and second stopper bodies 36, 38 is in contact with the inner circumferential surface of the first through hole 24 on the first inner tube member 18 side (the left side in FIG. 5), while being remote therefrom on the first outer tube member 20 side (the right side in FIG. 5). Since the position in the front-back direction of the divided insert 42 within the first through hole 24 is biased toward the first inner tube member 18 side in this way, the lateral plate part 50 of the connector 46 is shortened in the front-back direction.

In a state where the first and second stopper bodies 36, 38 are attached to the first inner tube member 18 and inserted in the first through hole 24 in this way, the stopper rubber 34 is constituted by the first and second stopper bodies 36, 38. Moreover, an insert 52 of the stopper rubber 34 is constituted by the divided inserts 42, 42 of the first and second stopper bodies 36, 38 in a state of being inserted in the first through hole 24.

In the insert 52 of the stopper rubber 34, as shown in FIG. 5, a gap 54 is formed in the vertically middle portion. By the lower end of the divided insert 42 of the first stopper body 36 and the upper end of the divided insert 42 of the second stopper body 38 being arranged apart in the vertical direction, the gap 54 is formed vertically between such divided inserts 42, 42. In the present practical embodiment, since the first stopper body 36 and the second stopper body 38 are roughly identical in shape and are arranged so as to be vertically inverted with respect to each other, the gap 54 is formed in the vertically center portion of the insert 52 of the stopper rubber 34. Furthermore, the lower face of the divided insert 42 of the first stopper body 36 and the upper face of the divided insert 42 of the second stopper body 38 are arranged such that their entire faces are vertically apart from each other. Thus, the gap 54 is formed continuously over the entirety in the circumferential direction and in the diametrical direction of the insert 52. As will be apparent from the above, in the present practical embodiment, the lower face of the divided insert 42 of the first stopper body 36 and the upper face of the divided insert 42 of the second stopper body 38 constitute axially opposed faces 56, 56 that are provided on the opposite sides of the gap 54 and are opposed to each other with the gap 54 in between in the vertical direction.

On the other hand, to the other end of the rod main body 12 in the front-back direction, the second bushing 16 is provided as shown in FIGS. 1 to 3, 5, and the like. The second bushing 16 has a structure in which a second inner tube member 58 and a second outer tube member 60 are elastically connected by a second rubber elastic body 62.

The second inner tube member 58 is a high rigidity component formed of metal or the like, and has a small-diameter, generally round tubular shape extending straightly in the left-right direction. Besides, the second inner tube member 58 is inserted through an intermediate sleeve 64. The intermediate sleeve 64 is formed of metal or the like and has a thin, generally round tubular shape. The second inner tube member 58 and the intermediate sleeve 64 are elastically connected to each other by the second rubber elastic body 62 in the radial direction. The second rubber elastic body 62 has a generally round tubular shape, and its inner circumferential surface is bonded by vulcanization to the outer circumferential surface of the second inner tube member 58, while its outer circumferential surface is bonded by vulcanization to the inner circumferential surface of the intermediate sleeve 64.

The second outer tube member 60 is a high rigidity component integrally formed with the rod main body 12, and has a generally round tubular shape extending straightly in the left-right direction. The intermediate sleeve 64 fixed to the second rubber elastic body 62 is secured by being press-fitted into the second outer tube member 60, whereby the second bushing 16 is constituted at the other end of the rod main body 12 in the front-back direction. In the present practical embodiment, the rod main body 12 is integrally formed with the first outer tube member 20 and the second outer tube member 60. However, it would also be acceptable that, for example, the first outer tube member 20 and the second outer tube member 60 are formed independently of the rod main body 12, and are fixed to the opposite ends of the rod main body 12 by welding or the like.

Figure 3:
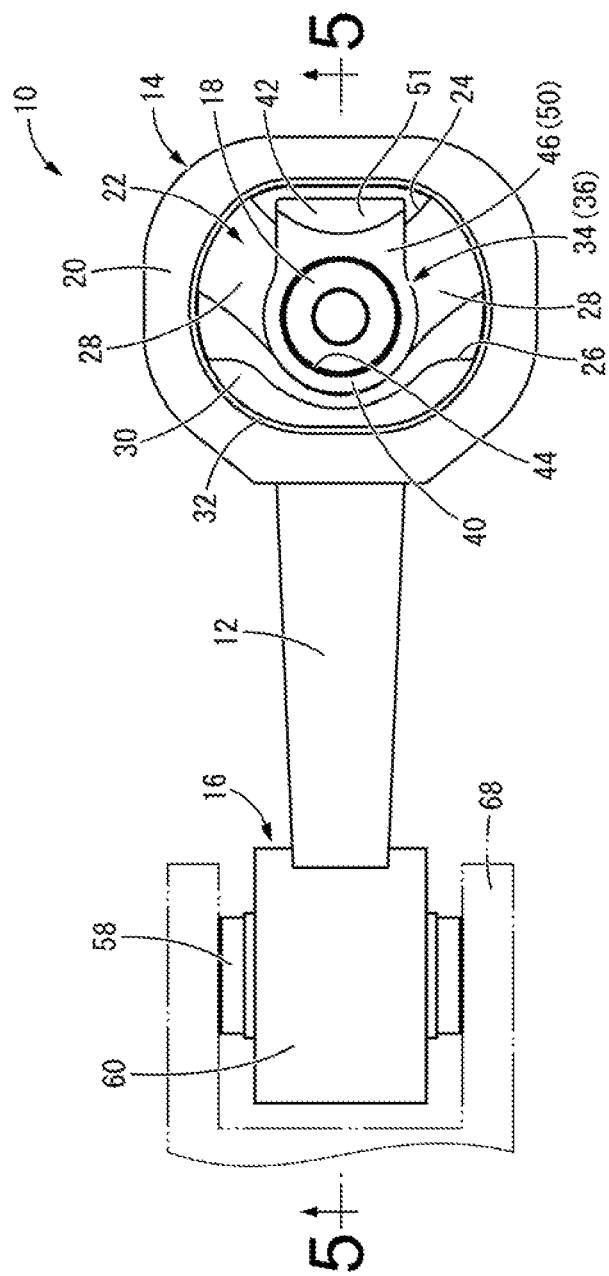
FIG. 3 is a plan view of the torque rod shown in FIG. 2.
Figure 4:
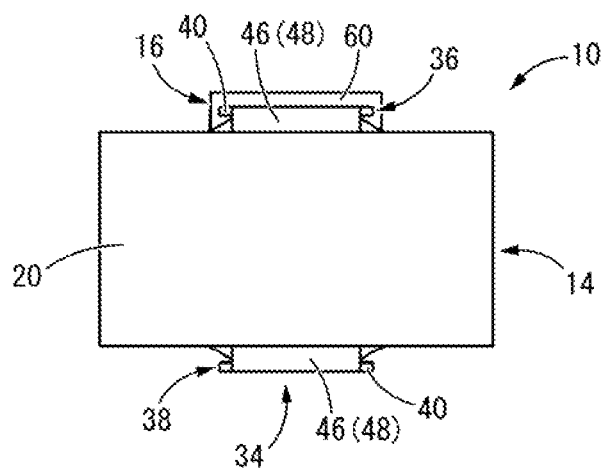
FIG. 4 is a right side view of the torque rod shown in FIG. 2.

With the torque rod 10 of the above construction, for example, the first inner tube member 18 of the first bushing 14 is attached to a vehicle body 66 (see FIG. 2), while the second inner tube member 58 of the second bushing 16 is attached to a power unit 68 (see FIG. 3). With this arrangement, the vehicle body 66 and the power unit 68 are connected in a vibration-damping state by the torque rod 10 including the first and second bushings 14, 16.

Then, for example, when the first outer tube member 20 is largely displaced relative to the rod main body 12 side (the left side in FIG. 5) with respect to the first inner tube member 18 in the first bushing 14 due to acceleration or deceleration of the automobile, the insert 52 of the stopper rubber 34 is sandwiched between the first inner tube member 18 and the first outer tube member 20 in the front-back direction and compressed in the thickness direction. By so doing, the relative displacement between the first inner tube member 18 and the first outer tube member 20 in the front-back direction is limited by the stopper rubber 34, thereby preventing excessive deformation of the first rubber elastic body 22. This may improve durability of the first rubber elastic body 22.

With the first rubber elastic body 22 of the present practical embodiment, since the first and second through holes 24, 26 are provided, the shear spring component becomes predominant with respect to a load input in the front-back direction, so that soft spring characteristics are realized. On the other hand, the insert 52 of the stopper rubber 34 is configured to be compressed between the first inner tube member 18 and the first outer tube member 20 when a large load is input in the front-back direction, thereby realizing effective limitation of displacement owing to the compression spring component.

Here, the insert 52 of the stopper rubber 34 has a gap 54 in the axially middle portion, and the axially opposed faces 56, 56, which are free surfaces, are provided on the axially opposite sides of the gap 54. With this configuration, when the insert 52 is compressed in the thickness direction, it is possible to prevent sudden development of high dynamic spring in a high load range where the amount of deformation is large, so as to reduce sudden change in the stopper characteristics. This can improve the ride comfort, and prevent the reaction force of the stopper load from sharply acting on the fastening structure such as a bolt for fastening the first inner tube member 18 and the first outer tube member 20, thereby avoiding damage to the fastening structure or the like.

Furthermore, in the present practical embodiment, the stopper rubber 34 comprises the first stopper body 36 and the second stopper body 38, and the gap 54 is formed vertically between the divided insert 42 of the first stopper body 36 and the divided insert 42 of the second stopper body 38. In this way, with the structure in which the insert 52 is vertically divided, the axially opposed faces 56, 56 can be obtained in a larger area, thereby advantageously achieving the effect of reducing sudden change in the stopper characteristics.

In addition, with the stopper rubber 34 of the present practical embodiment, the circumferentially opposite end faces of the insert 52 are free surfaces without being restrained. Thus, the deformation of the circumferentially opposite end faces of the insert 52 will also advantageously realize soft springs in a high load range.

Besides, the first stopper body 36 and the second stopper body 38 that constitute the stopper rubber 34 are attached to the first inner tube member 18 by the respective attachments 40. Therefore, it is easy to hold the insert 52 of the stopper rubber 34 at a predetermined position within the first through hole 24, thereby stably obtaining the desired stopper action.

Moreover, in the first and second stopper bodies 36, 38, the connector 46 connecting the divided insert 42 and the attachment 40 is thin-walled, so that the connector 46 is less prone to have an influence on the stopper characteristics due to compression of the divided insert 42. In particular, as shown in FIGS. 2 and 3, even when the upper face of the connector 46 is restrained by another component such as the vehicle body 66, the step surface 51 is formed between the vertical plate part 48 of the connector 46 and the divided insert 42 due to the difference of thickness therebetween. With this configuration, a free surface is surely obtained by the step surface 51 on the axially outer end face of the divided insert 42, thereby more advantageously preventing the sudden change in the stopper characteristics.

Additionally, when the first inner tube member 18 and the first outer tube member 20 indirectly come into contact with the divided inserts 42, 42 of the first and second stopper bodies 36, 38 due to the load input in the front-back direction, the initial contact faces of the first inner tube member 18 and the first outer tube member 20 with respect to the divided inserts 42, 42 of the first and second stopper bodies 36, 38 are positioned at a predetermined distance from the axially opposite ends toward the center within the first through hole 24. Therefore, even in the case where, for example, the axial opening of the first through hole 24 is covered by another component, a space for allowing deformation of the first and second stopper bodies 36, 38 will be surely obtained within the first through hole 24, thereby exhibiting more stable cushioning action.

Further, in the present practical embodiment, the stopper rubber 34 and the first rubber elastic body 22 are formed of mutually different materials, and the rubber hardness of the stopper rubber 34 is smaller than that of the first rubber elastic body 22. This configuration makes it possible to ameliorate the impact when the insert 52 of the stopper rubber 34 comes into contact with the inner circumferential surface of the first through hole 24 on the first outer tube member 20 side, as well as to reduce the sudden change in the spring characteristics due to compression of the insert 52.

Figure 14:
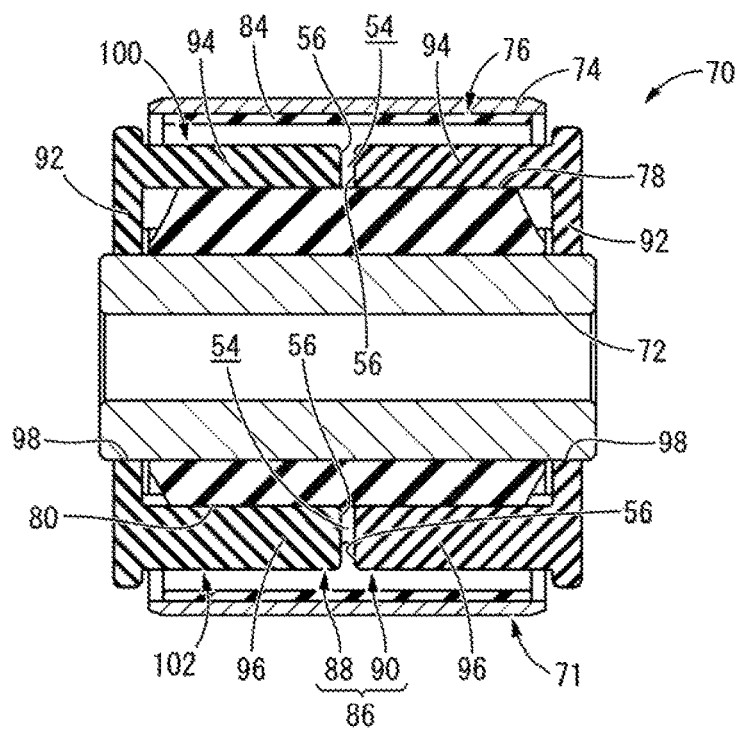
FIG. 14 is a cross-sectional view taken along line 14-14 of FIG. 12.
Figure 15:
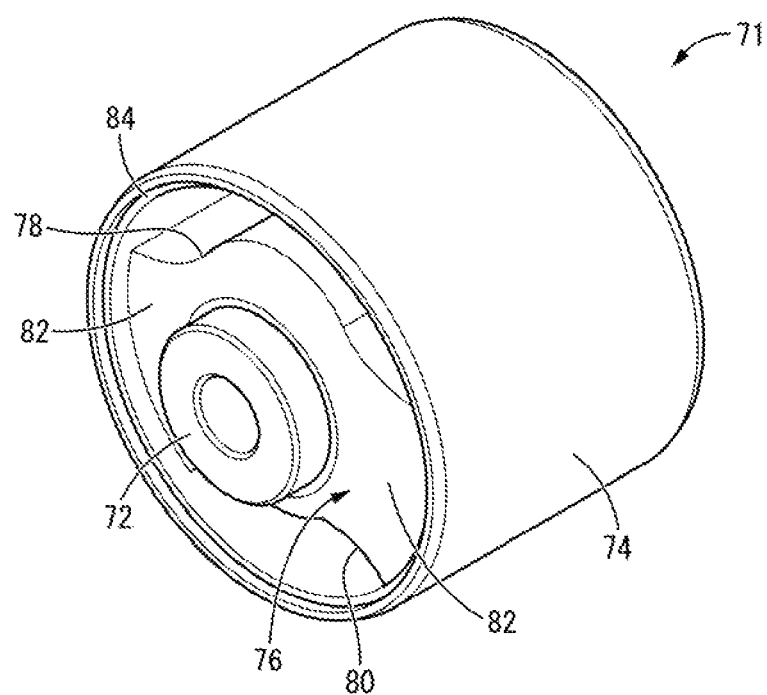
FIG. 15 is a perspective view of a mount main body that constitutes the motor mount shown in FIG. 11.

FIGS. 11 to 14 show an automotive motor mount 70 as a second practical embodiment of a tubular vibration-damping device constructed according to the present invention. The motor mount 70 includes a mount main body 71 and a stopper rubber 86 (described later) attached to the mount main body 71. As shown in FIG. 15, the mount main body 71 has a structure in which an inner shaft member 72 and an outer tube member 74 are elastically connected to each other by a main rubber elastic body 76. In the description of the present practical embodiment, as a general rule, the vertical direction refers to the vertical direction in FIG. 12, the front-back direction refers to the lateral direction in FIG. 13, which is the axial direction, and the lateral direction refers to the lateral direction in FIG. 12.

Described more specifically, the inner shaft member 72 is a high rigidity component formed of metal or the like, and has a thick, small-diameter, generally round tubular shape, while extending straightly in the front-back direction. Meanwhile, the outer tube member 74 is a high rigidity component formed of metal or the like, and has a thin, large-diameter, generally round tubular shape. The outer tube member 74 extends straightly in the front-back direction, and has a smaller dimension in the front-back direction than the inner shaft member 72.

Then, the inner shaft member 72 is inserted through the radial inside of the outer tube member 74, and the inner shaft member 72 and the outer tube member 74 are elastically connected to each other by the main rubber elastic body 76. The main rubber elastic body 76 has a thick round tubular shape overall, and a first through hole 78 is formed on the upper side of the inner shaft member 72, while a second through hole 80 is formed on the lower side of the inner shaft member 72. Besides, the main rubber elastic body 76 includes a left/right pair of connection arms 82, 82 extending in the axis-perpendicular direction circumferentially between the first through hole 78 and the second through hole 80, and the inner shaft member 72 and the outer tube member 74 are connected by the connection arms 82, 82. In the present practical embodiment in particular, the first through hole 78 has a circumferential length greater than that of the second through hole 80, whereby the elastic principal axis of the connection arms 82, 82 in the direction of connection extends while sloping downward from the inner shaft member 72 toward the outer tube member 74. A thin, tubular rubber sheath layer 84 provided to the main rubber elastic body 76 is fixed to the inner circumferential surface of the outer tube member 74 about the entire circumference.

Further, a stopper rubber 86 is attached to the inner shaft member 72. As shown in FIG. 14, the stopper rubber 86 comprises a first stopper body 88 and a second stopper body 90. The first stopper body 88 and the second stopper body 90 of the present practical embodiment have roughly the same structure and are used by being inverted in the front-back direction. Thus, the first stopper body 88 will be described based on FIGS. 16 to 18, and the detailed description of the second stopper body 90 is omitted.

Figure 16:
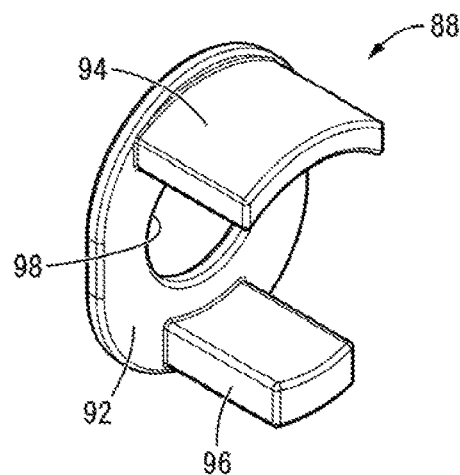
FIG. 16 is a perspective view of a stopper rubber that constitutes the motor mount shown in FIG. 11.
Figure 17:
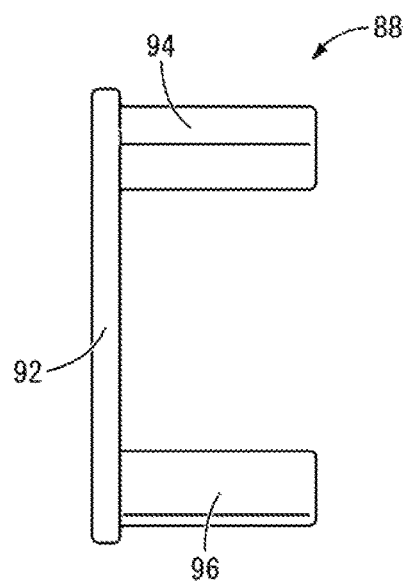
FIG. 17 is a right side view of the stopper rubber shown in FIG. 16.
Figure 18:
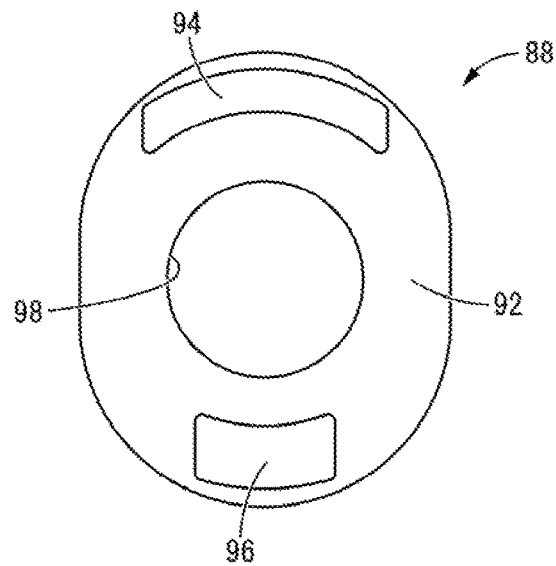
FIG. 18 is a rear view of the stopper rubber shown in FIG. 16.

As shown in FIGS. 16 to 18, the first stopper body 88 integrally includes an attachment 92 to the inner shaft member 72, and upper and lower two divided inserts 94, 96.

The attachment 92 has a roughly elliptical plate shape whose major axis is aligned with the vertical direction, and its center portion is penetrated by a mounting hole 98 in the front-back direction.

As shown in FIG. 18, the divided inserts 94, 96 each have a plate shape curving and extending in the circumferential direction with a roughly constant thickness dimension, and project from one face in the front-back direction of the attachment 92. Besides, the divided insert 94 and the divided insert 96 each have a projecting dimension in the front-back direction smaller than half of the dimension of the outer tube member 74 in the front-back direction, and their projecting dimensions are roughly the same as each other (see FIG. 17). Moreover, as shown in FIG. 18, the divided insert 94 and the divided insert 96 have the thickness dimensions in the radial direction that are different from each other, and the lower divided insert 96 is thicker than the upper divided insert 94.

Furthermore, the divided insert 94 and the divided insert 96 have the widthwise dimensions in the circumferential direction that are different from each other, and the upper divided insert 94 is wider than the lower divided insert 96.

With the first stopper body 88 constructed in the above manner, by the front end of the inner shaft member 72 being inserted through the mounting hole 98 of the attachment 92, the attachment 92 is attached to the inner shaft member 72. The attachment 92 may be detachably fitted to the inner shaft member 72 in a non-adhesive manner, or may alternatively be fixed thereto by an adhesive or the like.

Further, the divided inserts 94, 96 of the first stopper body 88 are respectively inserted in the first and second through holes 78, 80 from the front opening, namely, the first axial opening. The divided insert 94 is overlapped on the inner circumferential surface of the first through hole 78 in a state of contact on the inner shaft member 72 side, while being vertically remote from the inner circumferential surface of the first through hole 78 on the outer tube member 74 side. Similarly, the divided insert 96 is overlapped on the inner circumferential surface of the second through hole 80 in a state of contact on the inner shaft member 72 side, while being vertically remote from the inner circumferential surface of the second through hole 80 on the outer tube member 74 side. Note that the thin and wide divided insert 94 is inserted in the first through hole 78, while the thick and narrow divided insert 96 is inserted in the second through hole 80. Moreover, the vertical distance between the divided insert 94 and the rubber sheath layer 84 in opposition and the vertical distance between the divided insert 96 and the rubber sheath layer 84 in opposition are roughly equal.

Also, with the second stopper body 90, the attachment 92 is attached to the back end with respect to the inner shaft member 72, and the divided inserts 94, 96 are respectively inserted in the first and second through holes 78, 80 from the back opening, namely, the second axial opening.

In this way, by the first stopper body 88 and the second stopper body 90 being arranged so as to face each other in the front-back direction, the stopper rubber 86 is constituted by the first stopper body 88 and the second stopper body 90. Moreover, the stopper rubber 86 includes an insert 100 constituted by the divided insert 94 of the first stopper body 88 and the divided insert 94 of the second stopper body 90, and an insert 102 constituted by the divided insert 96 of the first stopper body 88 and the divided insert 96 of the second stopper body 90.

Here, in the inserts 100, 102 of the stopper rubber 86, respective gaps 54 are formed in their middle portions in the front-back direction. Specifically, the divided inserts 94, 96 of the first stopper body 88 and the divided inserts 94, 96 of the second stopper body 90 are situated in opposition so as to be apart from each other in the front-back direction, so that the gaps 54 are each formed between the divided inserts 94, 96 of the first stopper body 88 and the divided inserts 94, 96 of the second stopper body 90 in the front-back direction. The distal end faces of the divided inserts 94, 96 of the first stopper body 88 and the distal end faces of the divided inserts 94, 96 of the second stopper body 90 positioned on the opposite sides of the gaps 54 constitute axially opposed faces 56, 56 that are apart from and opposed to each other in the front-back direction, which is the axial direction. Each of the inserts 100, 102 includes a pair of the axially opposed faces 56, 56.

During input in the vertical direction which is the direction of formation of the first and second through holes 78, 80, the relative displacement between the inner shaft member 72 and the outer tube member 74 is configured to be limited by the inner shaft member 72 and the outer tube member 74 coming into contact indirectly via the insert 100 or the insert 102.

Here, when the inserts 100, 102 of the stopper rubber 86 are compressed in the vertical direction, the inserts 100, 102 are allowed to deform so as to expand into the gaps 54, 54 in the middle portion in the front-back direction, making it possible for the inserts 100, 102 to undergo compressive deformation in the vertical direction with softer spring characteristics. With this configuration, even with respect to an input of a larger load, development of high dynamic spring of the inserts 100, 102 will be suppressed and the impact due to the sudden change of the spring characteristics or the like is reduced. Besides, the stopper reaction force will be ameliorated, thereby preventing damage to the fastening structure to a power unit or a vehicle body (not shown), or the like.

Further, in the present practical embodiment, the inserts 100, 102 are inserted into the respective first and second through holes 78, 80, whereby the relative displacement between the inner shaft member 72 and the outer tube member 74 will be limited by the stopper rubber 86 on both the upper and lower sides. This makes it possible to prevent excessive deformation of the main rubber elastic body 76 with respect to inputs from both the upper and lower sides, thereby improving durability.

Moreover, since the first stopper body 88 and the second stopper body 90 constituting the stopper rubber 86 each integrally comprise the upper divided insert 94 and the lower divided insert 96, the stopper rubber 86 including the upper and lower inserts 100, 102 is obtained with a small number of parts.

Furthermore, the insert 102 inserted into the second through hole 80 positioned on the lower side is thicker than the insert 100 inserted into the first through hole 78 positioned on the upper side. With this configuration, in the lower insert 102 where a larger load is likely to input, it is possible to more advantageously realize improvement in durability and low dynamic spring behavior.

As shown in the stopper rubber 86 of the present practical embodiment, the inserts 100, 102 may be directly connected to the attachment 92, and the thin connector 46 as shown in the stopper rubber 34 of the preceding practical embodiment for connecting the insert 52 and the attachment 40 is not essential. In addition, the insert and the attachment may be indirectly connected by a connector having the same thickness as or a greater thickness than the insert and the attachment.

Figure 19:
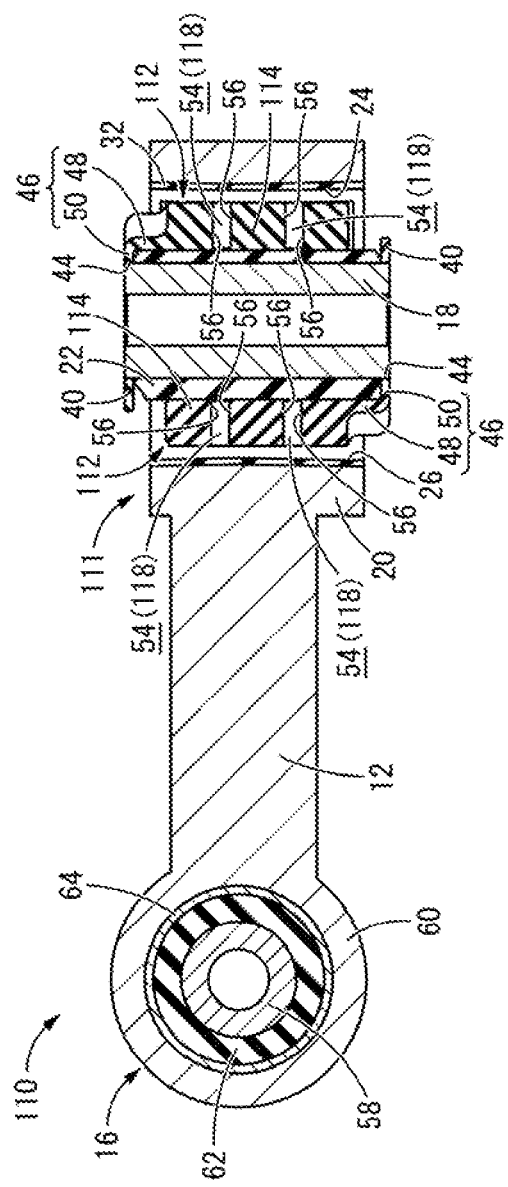
FIG. 19 is a cross-sectional view showing a torque rod according to a third practical embodiment of the present invention.

FIG. 19 shows an automotive torque rod 110 as a third practical embodiment comprising a tubular vibration-damping device constructed according to the present invention. The torque rod 110 includes a first bushing 111 serving as a tubular vibration-damping device, and the first bushing 111 has a structure in which a first inner tube member 18 and a first outer tube member 20 are elastically connected to each other by a first rubber elastic body 22. Furthermore, the first bushing 111 includes a stopper rubber 112 attached to the upper end of the first inner tube member 18 in a state of being inserted in a first through hole 24 of the first rubber elastic body 22, and a stopper rubber 112 attached to the lower end of the first inner tube member 18 in a state of being inserted in a second through hole 26. In the description of the present practical embodiment, components and parts that are substantially identical with those in the preceding first and second practical embodiments will be assigned like symbols and not described in any detail.

Figure 20:
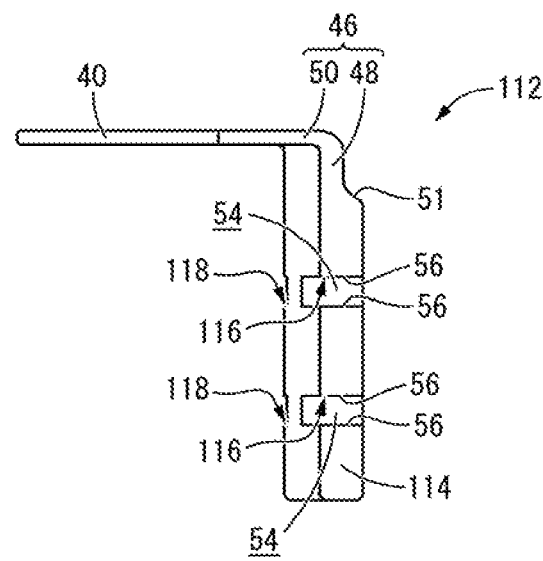
FIG. 20 is a front view of a stopper rubber that constitutes a first bushing of the torque rod shown in FIG. 19.
Figure 21:
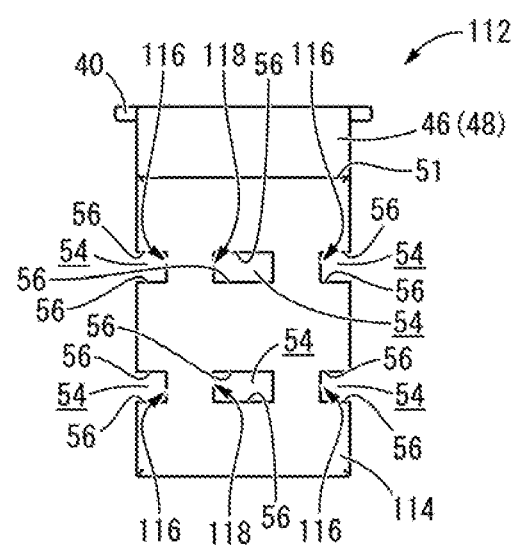
FIG. 21 is a right side view of the stopper rubber shown in FIG. 20.

Described more specifically, as shown in FIGS. 20 and 21, the stopper rubber 112 has a structure in which an insert 114 and an attachment 40 are integrally connected by a connector 46. The insert 114 has a plate shape extending in the vertical direction (the vertical direction in FIG. 20), which is the axial direction of the first bushing 111, with a roughly arcuate cross section. The surface on the side of the first inner tube member 18 when inserted in the first through hole 24 or the second through hole 26 is a convex curving surface, while the surface on the side of the first outer tube member 20 is a roughly flat surface. Moreover, unlike the preceding practical embodiments, the insert 114 of the present practical embodiment is not divided in the vertical direction, and as shown in FIG. 19, the insert 114 is longer than half of the lengths of the first and second through holes 24, 26 in the vertical direction. Besides, the vertical distance between the upper openings of the first and second through holes 24, 26 and the upper end of the insert 114, and the vertical distance between the lower openings of the first and second through holes 24, 26 and the lower end of the insert 114, are roughly equal.

Furthermore, as shown in FIGS. 20 and 21, in the vertically middle portion of the insert 114, notches 116 serving as partial dividers are formed. The notches 116 are provided to the opposite ends in the circumferential direction (the lateral direction in FIG. 21) of the insert 114, and open radially outward while extending so as to penetrate the insert 114 in the thickness direction. In the present practical embodiment, four notches 116, 116, 116, 116 are formed in the insert 114, at the circumferentially opposite ends of two locations in the vertical direction.

Additionally, in the vertically middle portion of the insert 114, passage holes 118 serving as partial dividers are formed. The passage holes 118 are provided at the circumferentially center portion of the insert 114, so as to penetrate with a roughly constant quadrangular cross section in the thickness direction. In the present practical embodiment, two passage holes 118, 118 are provided so as to be vertically remote from each other, and each passage hole 118 is arranged circumferentially between the notches 116, 116.

In this way, by the notch 116 and the passage hole 118 being formed in the vertically middle portion of the insert 114, a plurality of gaps 54 are constituted in the vertically middle portion of the insert 114, and axially opposed faces 56, 56 are provided on the vertically opposite sides of each gap 54. The number and arrangement of the notches 116 and the passage holes 118 can be changed as appropriate, and the notches 116 and the passage holes 118 can be provided at one location, or three or more locations in the vertical direction. It is also possible to provide the notch 116 only at one circumferential end, and to arrange a plurality of the passage holes 118 in the circumferential direction.

As shown in FIG. 19, regarding one stopper rubber 112, an attachment 40 is attached to the upper end of the first inner tube member 18, and the insert 114 is inserted in the first through hole 24 of the first rubber elastic body 22. Regarding the other stopper rubber 112, an attachment 40 is attached to the lower end of the first inner tube member 18, and the insert 114 is inserted in the second through hole 26 of the first rubber elastic body 22. In the present practical embodiment, the insert 114 of each stopper rubber 112 is inserted from the corresponding one side with respect to the first and second through holes 24, 26, so that the insert 114 of one stopper rubber 112 is inserted in the first through hole 24 from the upper side, while the insert 114 of the other stopper rubber 112 is inserted in the second through hole 26 from the lower side.

When a load in the front-back direction (the lateral direction in FIG. 19) is input across the first inner tube member 18 and the first outer tube member 20 so that the first inner tube member 18 displaces relative to the first outer tube member 20, the relative displacement between the first inner tube member 18 and the first outer tube member 20 is configured to be limited by the first inner tube member 18 and the first outer tube member 20 coming into indirect contact via the first rubber elastic body 22 and the insert 114 of the stopper rubber 112.

Here, in the insert 114 of the stopper rubber 112, the notches 116 and the passage holes 118 are formed, and the notches 116 and the passage holes 118 provide the gaps 54. Accordingly, when the insert 114 is compressed in the thickness direction, the axially opposed faces 56, 56, which are free surfaces owing to the gaps 54, will be allowed to deform so as to expand, thereby suppressing a sudden development of high dynamic spring in the insert 114 due to increase in the amount of deformation. Therefore, even during input of a large load by which the insert 114 is greatly compressed, the impact due to the sudden development of high dynamic spring or the like will be reduced, and the stopper reaction force acting on the fastening structure of the vehicle body (not shown) and the first inner tube member 18 will be decreased.

As described above, the insert of the stopper rubber need not necessarily have a divided structure, and even when the insert is integrally formed in its entirety, a gap can be formed by the partial divider such as the notch and the passage hole illustrated in the present practical embodiment. Indeed, in the stopper rubber of the divided structure as described in the first and second practical embodiments, in addition to the gap between the divided inserts, it is also possible to adopt a gap formed by the partial divider as illustrated in the third practical embodiment.

Figure 22:
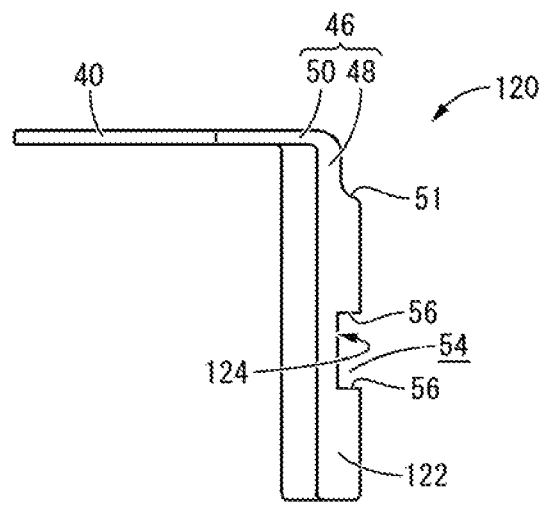
FIG. 22 is a front view of a stopper rubber that constitutes a tubular vibration-damping device according to a certain practical embodiment of the present invention.
Figure 23:
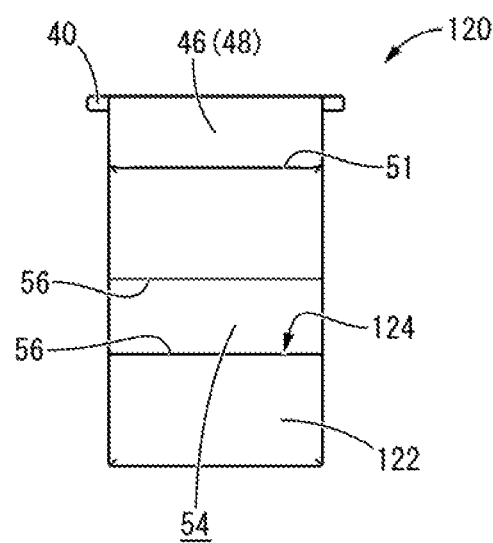
FIG. 23 is a right side view of the stopper rubber shown in FIG. 22.

In addition, the notch 116 and the passage hole 118 illustrated in the third practical embodiment are merely an example of the partial divider for forming the gap 54, and the gap 54 can also be formed by other structures. As a specific example, like a stopper rubber 120 shown in FIGS. 22 and 23, with respect to one surface in the thickness direction of a plate-shaped insert 122, a recessed groove 124 serving as a partial divider may be formed so as to extend in the circumferential direction, whereby the recessed groove 124 can provide the gap 54. Whereas FIGS. 22 and 23 illustrate the structure in which only a single recessed groove 124 is formed, a plurality of recessed grooves 124 may be formed.

Furthermore, for example, it would also be possible to cut the insert at the axially middle portion to form a minute gap in the cut portion, so that the sections may serve as the axially opposed faces. Alternatively, it would also be possible to make a slit serving as a partial divider in the axially middle portion of the insert to form a minute gap by the slit, so that the inner faces of the slit may serve as the axially opposed faces. When the gap and the axially opposed faces are formed by cutting or the slit, the sections or the inner faces of the slit may be in a state of substantial contact. The gap will be increased by the deformation of the insert at the time of load input, thereby making it also possible for the axially opposed faces, which are constituted by the sections or the inner faces of the slit, to become apart from each other.

While the present invention has been described in detail hereinabove in terms of the practical embodiments, the invention is not limited by the specific disclosures thereof. For example, the stopper rubber is not necessarily limited to the one attached to the inner shaft member, and may be attached to, for example, the outer tube member or the main rubber elastic body. Moreover, the structure of the attachment is not limited to the annular shape that is externally placed on the inner shaft member, and for example, in addition to a C-letter annular shape, a hook shape that is hooked on the axial end of the outer tube member or the main rubber elastic body etc. may also be adopted.

Besides, the tubular vibration-damping device according to the present invention can be applied to, for example, an engine mount, a suspension bushing, a sub-frame mount, and the like other than the bushing of the torque rod and the motor mount.

What is claimed is:

1. A tubular vibration-damping device comprising:
an inner shaft member;
an outer tube member;
a main rubber elastic body elastically connecting the inner shaft member and the outer tube member, the main rubber elastic body being penetrated by a through hole in an axial direction; and
a stopper rubber separated from the main rubber elastic body, the stopper rubber including an insert that is inserted in the through hole, wherein
a gap is provided in an axially middle portion of the insert, and the insert includes axially opposed faces that are opposed to each other in the axial direction with the gap in between,
wherein the stopper rubber includes an attachment attached to an axial end of the inner shaft member.

2. The tubular vibration-damping device according to claim 1, wherein
the stopper rubber comprises a first stopper body inserted in the through hole from a first axial opening thereof and a second stopper body inserted in the through hole from a second axial opening thereof,
the first stopper body and the second stopper body include respective divided inserts that constitute the insert, and
the gap is provided axially between the divided inserts.

3. The tubular vibration-damping device according to claim 1, wherein the gap is provided by a partial divider that is formed in the axially middle portion of the insert of the stopper rubber.

4. The tubular vibration-damping device according to claim 1, wherein the stopper rubber includes a connector extending from the insert in the axial direction, and the insert and the attachment are connected by the connector, while the connector is thinner than the insert.

5. The tubular vibration-damping device according to claim 1, wherein in the through hole, the insert of the stopper rubber is overlapped on an inner circumferential surface on a side of the inner shaft member.

6. The tubular vibration-damping device according to claim 1, wherein a rubber hardness of the stopper rubber is smaller than that of the main rubber elastic body.

7. The tubular vibration-damping device according to claim 1, wherein the insert of the stopper rubber is shorter than both of the inner shaft member and the outer tube member in the axial direction.

* * * * *